(12) United States Patent
Choi

(10) Patent No.: US 10,756,526 B2
(45) Date of Patent: Aug. 25, 2020

(54) COUPLING STRUCTURE OF BUS BAR

(71) Applicant: HYUNDAI MOBIS Co., Ltd., Seoul (KR)

(72) Inventor: Mun Ho Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/674,938

(22) Filed: Nov. 5, 2019

(65) Prior Publication Data
US 2020/0144803 A1 May 7, 2020

(30) Foreign Application Priority Data
Nov. 7, 2018 (KR) .......................... 10-2018-0135757

(51) Int. Cl.
| | |
|---|---|
| *H02G 5/00* | (2006.01) |
| *H02M 7/00* | (2006.01) |
| *H02B 1/20* | (2006.01) |
| *H01R 25/16* | (2006.01) |
| *H01R 4/48* | (2006.01) |

(52) U.S. Cl.
CPC ............ *H02G 5/007* (2013.01); *H01R 4/4809* (2013.01); *H01R 25/161* (2013.01); *H02B 1/20* (2013.01); *H02M 7/003* (2013.01)

(58) Field of Classification Search
CPC ......... H02G 5/007; H02B 1/20; H02M 7/003; H01R 4/4809; H01R 25/161
USPC .......................................................... 174/88 B
See application file for complete search history.

(56) References Cited

U.S. PATENT DOCUMENTS

| | | | | |
|---|---|---|---|---|
| 4,074,017 | A * | 2/1978 | Kinsey .................... | H01M 2/20 429/1 |
| 5,225,061 | A * | 7/1993 | Westerlund ............. | C25B 11/02 204/254 |
| 2014/0342612 | A1* | 11/2014 | Pfeuffer ................. | H01R 25/14 439/626 |
| 2016/0134060 | A1* | 5/2016 | Hwang .............. | H01R 13/6581 439/587 |
| 2018/0145463 | A1* | 5/2018 | Kiyuna .................. | H01R 13/64 |

* cited by examiner

*Primary Examiner* — Sherman Ng
(74) *Attorney, Agent, or Firm* — Knobbe Martens Olson & Bear LLP

(57) ABSTRACT

Provided is a coupling structure of a bus bar equipped in a power part. The coupling structure of the bus bar includes a female type bus bar and a male type bus bar respectively coupled to different elements of the power part, wherein the female type bus bar is fitting-coupled to the male type bus bar. In the coupling structure of the bus bar, since bus bars of high voltage elements are connected to each other by a connecting method instead of a conventional bolting coupling structure, the miniaturization effect and cooling effect of an inverter may increase, and moreover, a tool used to couple bus bars may be omitted, thereby enabling power parts to be easily disposed.

6 Claims, 7 Drawing Sheets

COUPLING STRUCTURE OF BUS BAR

CROSS-REFERENCE TO RELATED APPLICATIONS

This application claims priority under 35 U.S.C. § 119 to Korean Patent Application No. 10-2018-0135757, filed on Nov. 7, 2018, the disclosure of which is incorporated herein by reference in its entirety.

TECHNICAL FIELD

The present invention relates to a coupling structure of a bus bar, and more particularly, to a coupling structure of a bus bar, which includes a male type bus bar and a female type bus bar and enables direct coupling without using other componentry and tools such as bolting.

BACKGROUND

Generally, due to the output and efficiency of a high voltage battery, a driving-enabled distance of environment-friendly vehicles is shorter than conventional gasoline vehicles or diesel vehicles.

Moreover, technology for increasing an output of the high voltage battery is being developed for enhancing a driving distance. However, in an inverter which provides a power of the high voltage battery to a driving motor, all of the output of the high voltage battery should be processed by the inverter, and due to this, a high power part is needed.

That is, since higher power is needed compared to the related art, relevant power parts and connection elements are increasing in size.

For an electrical connection between power parts of the inverter, high power parts are connected to each other by using a bus bar, low power parts are connected to each other by using a wire, and bus bars are coupled to each other by using bolting.

However, by using a bolting coupling method, a space is limited in disposition of elements. Due to this, there is a problem where a total size of the inverter increases progressively, and moreover, since a deviation between workers is large, damage or a connection defect occurs in assembly.

Moreover, when a conventional bolting coupling structure between bus bars is applied, a space where a tool is provided is needed, and thus, internal power parts of the inverter are assembled as a stacking type.

That is, elements should be assembled one by one in the stacking type where some elements are disposed on a first layer and are assembled through bolting coupling and other elements are disposed on a layer disposed on the first layer and are assembled through bolting coupling, and should be coupled through bolting. For this reason, the disposition of elements is mainly fixed.

Moreover, for bolting coupling, a space where a tool is provided is needed in an upper portion, and a structure into which a nut is inserted is separately needed in a lower portion. Due to this, the cost increases.

SUMMARY

Accordingly, the present invention provides a coupling structure of a bus bar, in which bus bars of high voltage elements are connected to each other by a connecting method instead of a conventional bolting coupling structure, thereby increasing the miniaturization effect and cooling effect of an inverter.

In one general aspect, a coupling structure of a bus bar equipped in a power part includes a female type bus bar and a male type bus bar respectively coupled to different elements of the power part, wherein the female type bus bar is fitting-coupled to the male type bus bar.

The female type bus bar may include a female bus bar body fixing-coupled to the power part at one end thereof and a female bus bar coupling part provided at the other end of the female bus bar body.

The male type bus bar may include a male bus bar body fixing-coupled to the power part at one end thereof and a male bus bar coupling part provided at the other end of the male bus bar body and coupled to or separated from the female bus bar coupling part.

Each of the female bus bar body and the male bus bar body may be provided in plurality, and each of the female bus bar coupling part and the male bus bar coupling part may be provided in plurality.

The coupling structure of the bus bar may further include a mounting groove provided in an inner perimeter of the female bus bar coupling part and a spring mounted into the mounting groove.

The coupling structure of the bus bar may further include a spring mounted on an outer surface of the male bus bar coupling part.

An inner surface of the female bus bar coupling part and an outer surface of the male bus bar coupling part may each be provided in one of a circular shape, a tetragonal shape, and a polygonal shape.

The female bus bar coupling part may be connected or coupled to the power part.

The coupling structure of the bus bar may further include a protection cover detachably mounted on each of the female bus bar coupling part and the male bus bar coupling part.

The female type bus bar may include a female bus bar body fitting-coupled to the power part at one end thereof and a female bus bar coupling part provided at an end of the female bus bar body to have a groove shape.

The male type bus bar may include a male bus bar body fitting-coupled to the power part at one end thereof and a male bus bar coupling part provided at an end of the male bus bar body to have a groove shape so that the female bus bar coupling part is coupled to or separated from the male bus bar coupling part through a sliding operation performed in a horizontal direction.

The coupling structure may further include a coupling projection provided in the male bus bar coupling part.

The coupling structure of the bus bar may further include a leaf spring mounting groove provided in one of an upper portion and a lower portion of an inner surface of the female bus bar coupling part.

An end of the leaf spring mounting groove may be provided to be inclined.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
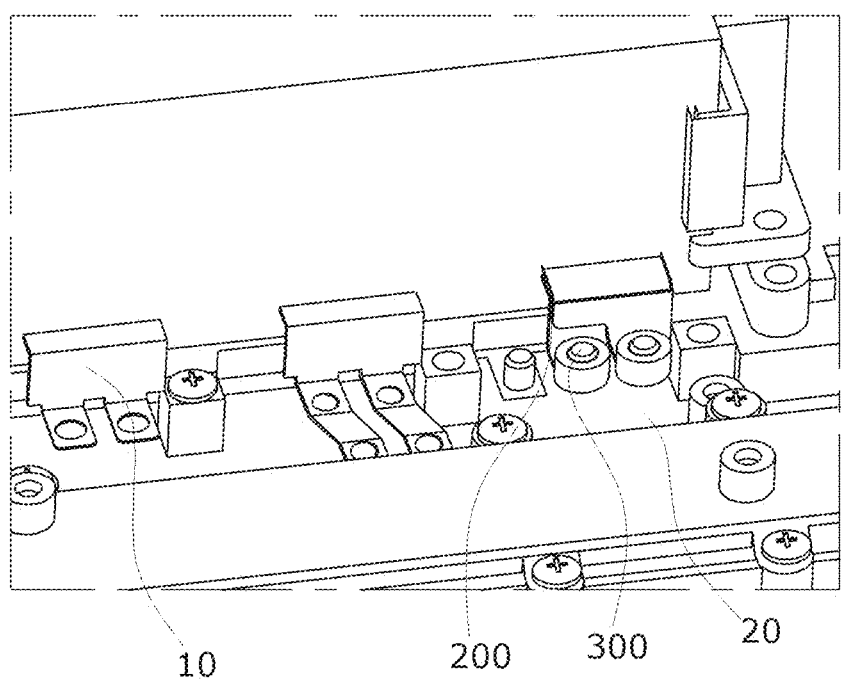
FIG. 1 is a diagram illustrating an embodiment of a coupling structure of a bus bar according to the present invention.
Figure 2:
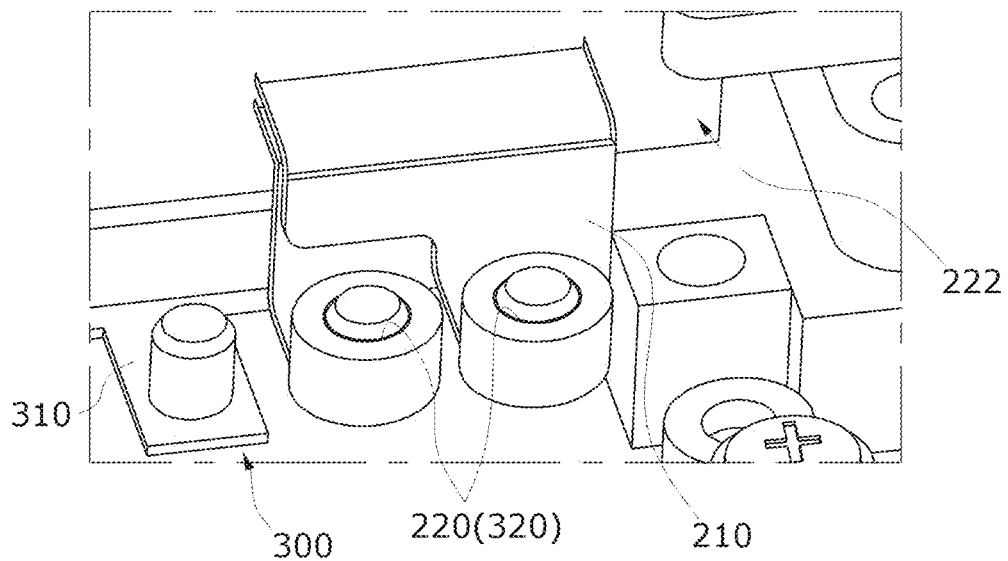
FIG. 2 is a diagram illustrating an embodiment of a coupling structure of a bus bar according to the present invention.
Figure 3:
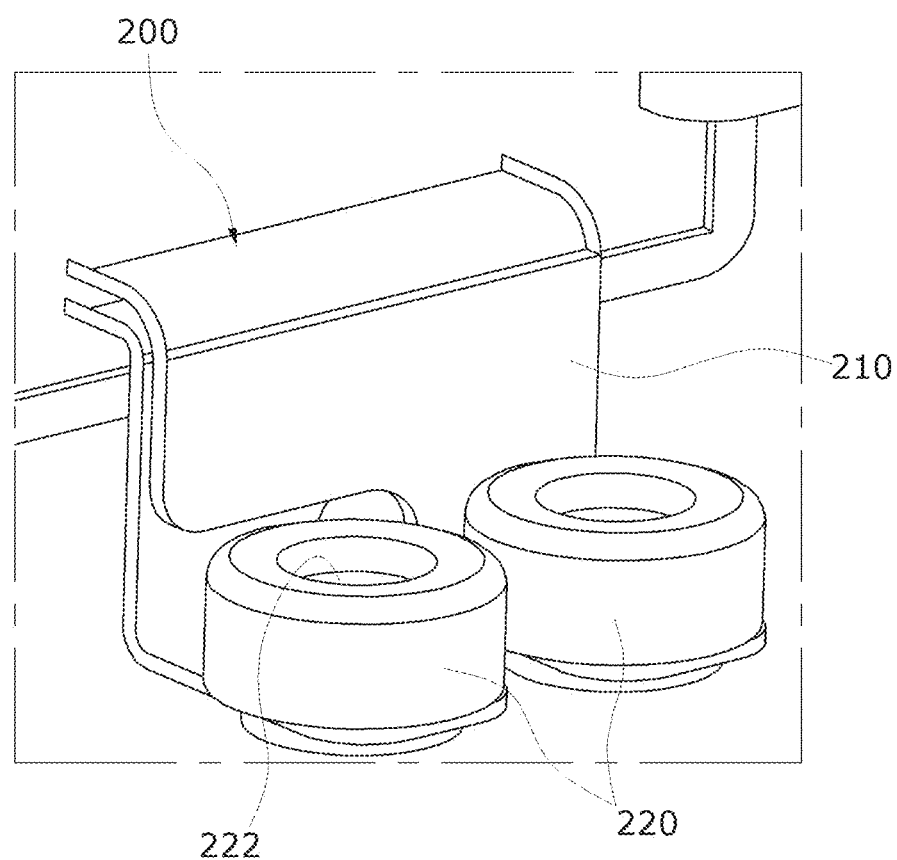
FIG. 3 is a perspective view illustrating a female type bus bar configuring a coupling structure of a bus bar according to the present invention.
Figure 4:
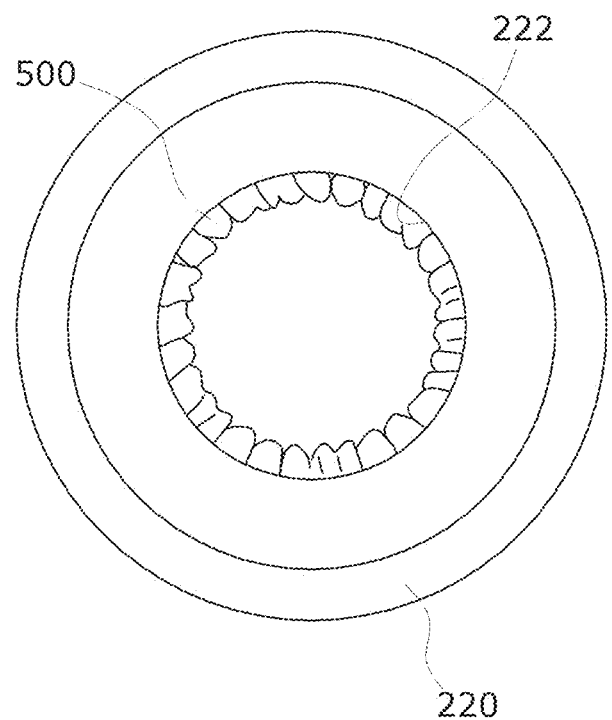
FIG. 4 is a plan view illustrating another embodiment of a female bus bar coupling part configuring a coupling structure of a bus bar according to the present invention.
Figure 5:
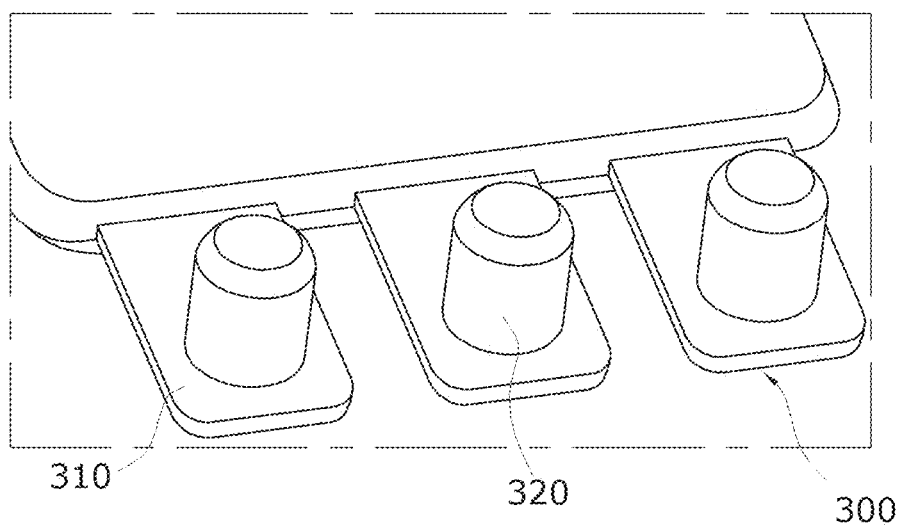
FIG. 5 is a perspective view illustrating a male type bus bar configuring a coupling structure of a bus bar according to the present invention.
Figure 6:
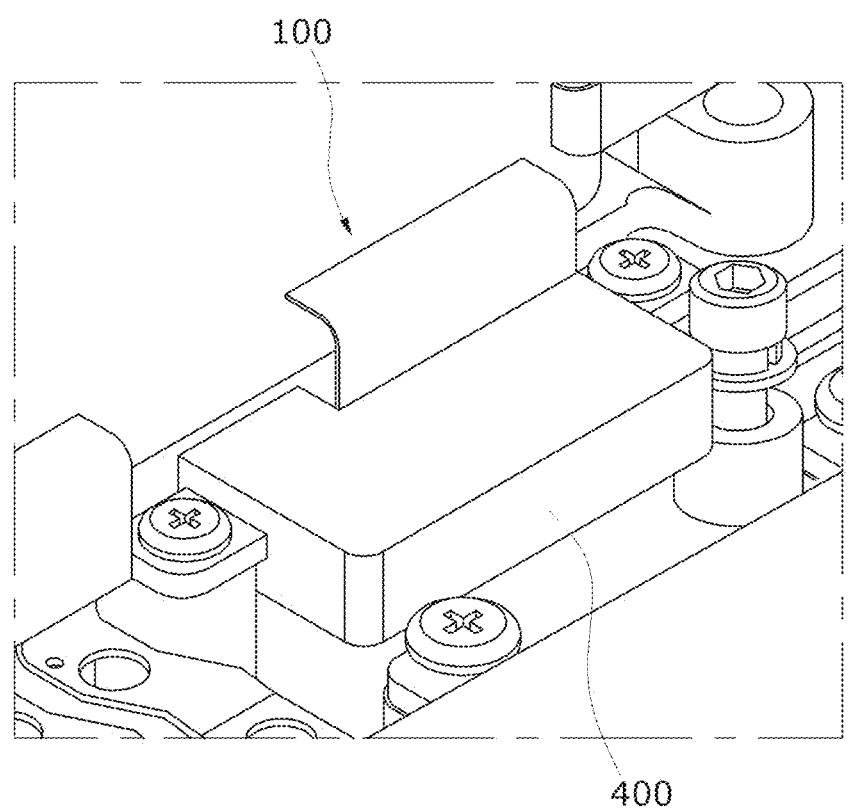
FIGS. 6 and 7 are a perspective view and a side view illustrating an installation state of a protection cover configuring a coupling structure of a bus bar according to the present invention.
Figure 7:
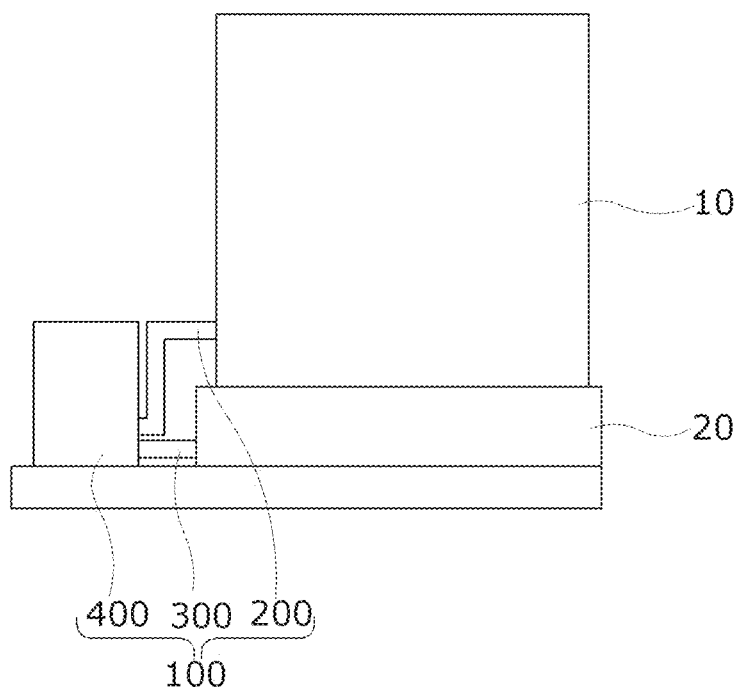
Figure 8:
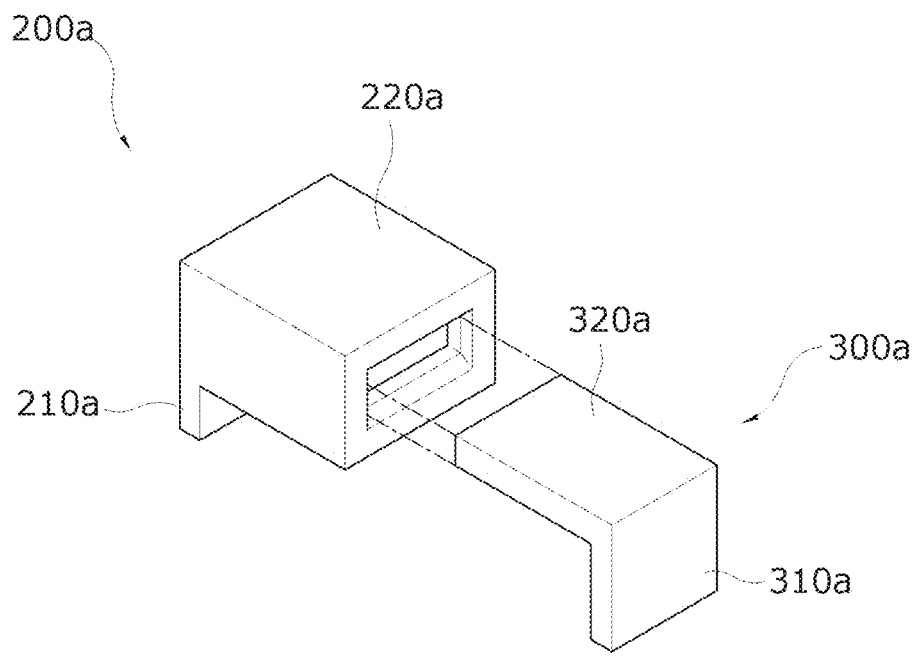
FIG. 8 is a perspective view illustrating another embodiment of a coupling structure of a bus bar according to the present invention.
Figure 9:
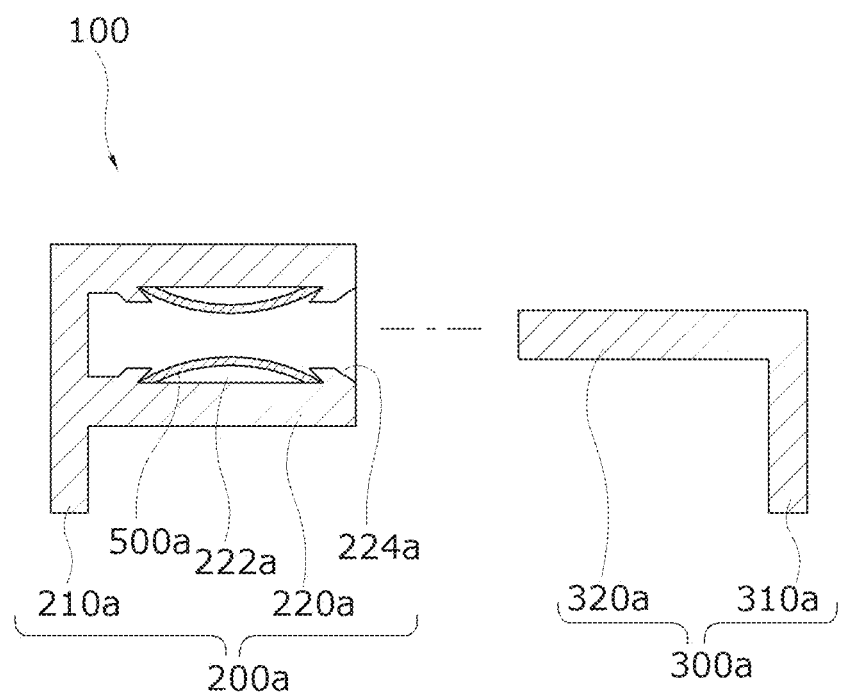
FIG. 9 is a cross-sectional view illustrating a female/male type bus bar of FIG. 8 according to an embodiment of the present invention.

FIG. 1 is a diagram illustrating an embodiment of a coupling structure of a bus bar according to the present invention. FIG. 2 is a diagram illustrating an embodiment of a coupling structure of a bus bar according to the present invention. FIG. 3 is a perspective view illustrating a female type bus bar configuring a coupling structure of a bus bar according to the present invention. FIG. 4 is a plan view illustrating another embodiment of a female bus bar coupling part configuring a coupling structure of a bus bar according to the present invention. FIG. 5 is a perspective view illustrating a male type bus bar configuring a coupling structure of a bus bar according to the present invention. FIGS. 6 and 7 are a perspective view and a side view illustrating an installation state of a protection cover configuring a coupling structure of a bus bar according to the present invention. FIG. 8 is a perspective view illustrating another embodiment of a coupling structure of a bus bar according to the present invention. FIG. 9 is a cross-sectional view illustrating a female/male type bus bar of FIG. 8 according to an embodiment of the present invention.

Embodiment 1

A coupling structure 100 of a bus bar according to an embodiment of the present invention may be equipped in a power part.

Also, the coupling structure 100 of the bus bar may include a female bus bar 200 and a male type bus bar 300, which are respectively coupled to elements 10 and 20 of another power part.

That is, the female bus bar 200 and the male type bus bar 300 may be respectively coupled to the elements 10 and 20 of the other power part and may be coupled thereto through a fitting structure.

Here, the coupling structure 100 of the bus bar may represent an example where the female bus bar 200 and the male type bus bar 300 are fitting-coupled to each other in a vertical direction and are fixed through a spring 500.

The female type bus bar 200 may include a female bus bar body 210 which is fixing-coupled to the power part 10 at one end thereof and a female bus bar coupling part 220 which is provided at the other end of the female bus bar body 210.

That is, the female type bus bar 200 may couple the one end of the female bus bar body 210 to the power part 10 and may be fitting-coupled to a male bus bar coupling part 320 configuring the male type bus bar 300 through the female bus bar coupling part 220 provided at the other end of the female bus bar body 210.

Here, each of the female bus bar body 210 and the female bus bar coupling part 220 may be provided in plurality, based on an environment and the purpose thereof.

The female bus bar body 210 may be provided in various shapes, and in an embodiment of the present invention, the female bus bar body 210 may be provided in a tetragonal shape which is easily manufactured.

Moreover, the female bus bar body 210 may be provided to be bent so that the female bus bar coupling part 220 is easily coupled to or separated from the male bus bar coupling part 320 of a male bus bar body 310.

An inner surface of the female bus bar coupling part 220 may be provided in one of a circular shape, a tetragonal shape, and a polygonal shape, and in an embodiment of the present invention, an example where the female bus bar coupling part 220 is provided in a circular shape will be described below.

That is, the inner surface of the female bus bar coupling part 220 may be provided in a circular donut shape on the basis of a coupling force and a contact area, and thus, the female bus bar coupling part 220 may be fitting-coupled to the male bus bar coupling part 320 of the male bus bar body 310.

A mounting groove 222 may be provided in an inner perimeter of the female bus bar coupling part 220, and a spring 500 may be mounted into the mounting groove 222.

In the female bus bar coupling part 220, the mounting groove 222 may be provided along the inner perimeter provided in a circular shape, and the spring 500 may be mounted into the mounting groove 222, thereby enhancing a fixing force and a coupling force when coupling the male bus bar coupling part 320.

Moreover, the female bus bar coupling part 220 may be connected or coupled to the power parts 10 and 20 through welding or a rivet so as to increase a coupling force of each of the power parts 10 and 20.

The male bus bar bus bar 300 may include the male bus bar body 310 which is fixing-coupled to the power part 20 at one end thereof and the male bus bar coupling part 320 which is provided at the other end of the male bus bar body 310.

That is, the male type bus bar 300 may couple the one end of the male bus bar body 310 to the power part 20, and the male bus bar coupling part 320 may be fitting-coupled to the female bus bar coupling part 220.

Here, each of the male bus bar body 310 and the male bus bar coupling part 320 may be provided in plurality, based on an environment and the purpose thereof.

The male bus bar body 310 may be provided in various shapes, and in an embodiment of the present invention, the male bus bar body 310 may be provided in a tetragonal shape which is easily manufactured.

In this case, the male bus bar body 310 may be provided in a structure where the other end thereof connected to the power part 20 is provided to extend and is coupled to a bus bar terminal.

An outer surface of the male bus bar coupling part 320 may be provided in one of a circular shape, a tetragonal shape, and a polygonal shape, and in an embodiment of the present invention, the outer surface of the male bus bar coupling part 320 may be provided in a circular shape to correspond to the inner surface of the female bus bar coupling part 220.

The spring 500 may be mounted on the outer surface of the male bus bar coupling part 320.

In the male bus bar coupling part 320, since the spring 500 is mounted on the outer surface thereof, a fixing force and a coupling force may be enhanced when coupling the female bus bar coupling part 220.

In the coupling structure of the bus bar, a protection cover 400 may be attachably/detachably provided at a coupling portion of a female/male bus bar coupling part provided in the female type bus bar 200 and the male type bus bar 300, thereby preventing damage caused by an external force.

Hereinafter, an embodiment of a coupling structure of a bus bar configured as described above will be described.

First, the female type bus bar 200 may be mounted on one surface of the power part 10 and may include the female bus bar body 210 which is provided to be bent in a tetragonal shape and the female bus bar coupling part 220 which is provided in the other end of the female bus bar body 210 in a circular donut shape and includes the mounting groove 222 provided in the inner perimeter thereof.

In this case, the spring 500 may be mounted into the mounting groove 222 of the female bus bar coupling part 220.

Moreover, the male type bus bar 300 may be mounted on the other surface of the power part 20 and may include the male bus bar body 310 which is provided in a tetragonal shape and the male bus bar coupling part 320 which is provided in the other end of the male bus bar body 310 in a cylindrical shape.

Subsequently, when the power parts 10 and 20 are assembled, the female bus bar coupling part 220 configuring the female type bus bar 200 may be fitting-coupled and fixed to the male bus bar coupling part 320 configuring the male type bus bar 300.

In this case, the female bus bar coupling part 220 may be more strongly fixed and coupled to the male bus bar coupling part 320 through the spring 500 mounted into the mounting groove 222.

Subsequently, the protection cover 400 may be provided at a coupling portion where the female bus bar coupling part 220 is coupled to the male bus bar coupling part 320.

In detail, the protection cover 400 may be provided in a structure which pressurizes the female bus bar coupling part 220 and the male bus bar coupling part 320, and thus, despite a vertical vibration and a lateral vibration, the protection cover 400 may stably fix the female bus bar coupling part 220 and the male bus bar coupling part 320.

In this case, the protection cover 400 may be formed of an insulating material for insulating the power parts.

Embodiment 2

A coupling structure 100 of a bus bar according to an embodiment of the present invention may be equipped in a power part.

Also, the coupling structure 100 of the bus bar may include a female bus bar 200a and a male type bus bar 300a, which are respectively coupled to elements 10 and 20 of another power part.

That is, the female bus bar 200a and the male type bus bar 300a may be respectively coupled to the elements 10 and 20 of the other power part and may be coupled thereto through a fitting structure.

Here, the coupling structure 100 of the bus bar may represent an example where the female bus bar 200a and the male type bus bar 300a are fitting-coupled to each other in a horizontal direction and are fixed through a spring 500a.

The female type bus bar 200a may include a female bus bar body 210a which is fixing-coupled to the power part 10 at one end thereof and a female bus bar coupling part 220a which is provided at an end of the female bus bar body 210a.

That is, in the female type bus bar 200a, an end portion of the female bus bar body 210a may be provided in a rectangular shape, and the female bus bar coupling part 220a may be provided in a groove shape. Therefore, the female type bus bar 200a may be fitting-coupled to a male bus bar coupling part 320a configuring the male type bus bar 300a.

An inner surface of the female bus bar coupling part 220a may be provided in one of a circular shape, a tetragonal shape, and a polygonal shape, and in an embodiment of the present invention, an example where the female bus bar coupling part 220a is provided in a tetragonal on the basis of a coupling force and a contact area.

Moreover, a leaf spring mounting groove 222a may be provided in one of an upper portion and a lower portion of the inner surface of the female bus bar coupling part 220a.

That is, the leaf spring mounting groove 222a may be provided in the female bus bar coupling part 220a to guide a position of a leaf spring 500a and to support both ends thereof.

In this case, in the leaf spring mounting groove 222a, an end 224a disposed at a portion communicating with the outside may be provided to be inclined, and the leaf spring 500a mounted into the leaf spring mounting groove 222a may be smoothly inserted thereinto.

Moreover, the leaf spring 500a mounted into the leaf spring mounting groove 222a may be provided as a plate having a certain thickness and size, and both ends thereof may be supported by the leaf spring mounting groove 222a.

That is, the leaf spring 500 may be fitting-coupled to the leaf spring mounting groove 222a disposed at an upper portion or a lower portion, and in a process of coupling the male bus bar coupling part 320a configuring the male type bus bar 300a, the male bus bar coupling part 320a may be fixed and supported by using an elasticity of the leaf spring 500a.

The male type bus bar 300a may include a male bus bar body 310a which is fixing-coupled to the power part 20 at one end thereof and the male bus bar coupling part 320a which is provided at an end of the male bus bar body 310a.

That is, in the male type bus bar 300a, one end of the male bus bar body 310a provided in a rectangular shape may be coupled to the power part 20, and then, the male bus bar coupling part 320a provided at an end of the male bus bar body 310a may be fitting-coupled to the female bus bar coupling part 220a.

Here, each of the male bus bar body 310a and the male bus bar coupling part 320a may be provided in plurality, based on an environment and the purpose thereof.

According to an embodiment of the present invention, the coupling structure of a bus bar may further include a coupling projection provided in the male bus bar coupling part 320a.

The male bus bar body 310a may be provided in various shapes, and in an embodiment of the present invention, the male bus bar body 310a may be provided in a tetragonal shape which is easily manufactured.

In the coupling structure 100 of the bus bar, a protection cover 400 may be attachably/detachably provided at a coupling portion of a female/male bus bar coupling part provided in the female type bus bar 200a and the male type bus bar 300a, thereby preventing damage caused by an external force.

Hereinafter, an embodiment of a coupling structure of a bus bar configured as described above will be described.

First, the female type bus bar 200a may be mounted on one surface of the power part 10 and may include the female bus bar body 210a which is provided to be bent in a tetragonal shape and the female bus bar coupling part 220 which is provided in an end of the female bus bar body 210a in a tetragonal shape and includes the leaf spring mounting groove 222a provided in an upper/lower portion of an inner surface thereof.

Moreover, the male type bus bar 300a may be mounted on one surface of the power part 20 and may include the male bus bar body 310a which is provided in a rectangular shape and the male bus bar coupling part 320a which is provided in an end of the male bus bar body 310a.

In this state, when the power parts 10 and 20 are assembled, the female bus bar coupling part 220a configuring the female type bus bar 200a may be fitting-coupled and fixed to the male bus bar coupling part 320a configuring the male type bus bar 300a.

In this case, the female bus bar coupling part 220a may be more strongly fixed and coupled to the male bus bar coupling part 320a through the spring 500a mounted into the leaf spring mounting groove 222a.

Subsequently, the protection cover 400 may be provided at a coupling portion where the female bus bar coupling part 220a is coupled to the male bus bar coupling part 320a.

In detail, the protection cover 400 may be provided in a structure which pressurizes the female bus bar coupling part 220a and the male bus bar coupling part 320a, and thus, despite a vertical vibration and a lateral vibration, the protection cover 400 may stably fix the female bus bar coupling part 220a and the male bus bar coupling part 320a.

In this case, the protection cover 400 may be formed of an insulating material for insulating the power parts.

In the coupling structure of the bus bar according to the embodiments of the present invention, since bus bars of high voltage elements are connected to each other by the connecting method instead of the conventional bolting coupling structure, the miniaturization effect and cooling effect of an inverter may increase, and moreover, a tool used to couple bus bars may be omitted, thereby enabling power parts to be easily disposed.

Moreover, in the coupling structure of the bus bar according to the embodiments of the present invention, since the bus bars of the power parts are directly coupled therebetween, the power parts may be freely disposed, and moreover, the use of a space in the inverter may increase, thereby decreasing a total size of the inverter.

Moreover, in the coupling structure of the bus bar according to the embodiments of the present invention, since a manual operation of coupling bus bars is omitted in producing products, a defect caused by a deviation of workers may be prevented, and moreover, a design which enables a bus bar to directly contact a cooler may be made, thereby more effectively cooling a high-output power part.

A coupling structure of a bus bar according to an embodiment of the present invention will be described below.

A coupling structure of a bus bar equipped in a power part, according to an embodiment of the present invention, includes a female type bus bar and a male type bus bar respectively coupled to different elements of the power part, wherein the female type bus bar is fitting-coupled to the male type bus bar.

According to some embodiments of the present invention, the female type bus bar may include a female bus bar body fixing-coupled to the power part at one end thereof and a female bus bar coupling part provided at the other end of the female bus bar body.

According to some embodiments of the present invention, the male type bus bar may include a male bus bar body fixing-coupled to the power part at one end thereof and a male bus bar coupling part provided at the other end of the male bus bar body and coupled to or separated from the female bus bar coupling part.

According to some embodiments of the present invention, each of the female bus bar body and the male bus bar body may be provided in plurality, and each of the female bus bar coupling part and the male bus bar coupling part may be provided in plurality.

According to some embodiments of the present invention, the coupling structure of the bus bar may further include a mounting groove provided in an inner perimeter of the female bus bar coupling part and a spring mounted into the mounting groove.

According to some embodiments of the present invention, the coupling structure of the bus bar may further include a spring mounted on an outer surface of the male bus bar coupling part.

According to some embodiments of the present invention, an inner surface of the female bus bar coupling part and an outer surface of the male bus bar coupling part may each be provided in one of a circular shape, a tetragonal shape, and a polygonal shape.

According to some embodiments of the present invention, the female bus bar coupling part may be connected or coupled to the power part.

According to some embodiments of the present invention, the coupling structure of the bus bar may further include a protection cover detachably mounted on each of the female bus bar coupling part and the male bus bar coupling part.

According to some embodiments of the present invention, the female type bus bar may include a female bus bar body fitting-coupled to the power part at one end thereof and a female bus bar coupling part provided at an end of the female bus bar body to have a groove shape.

According to some embodiments of the present invention, the male type bus bar may include a male bus bar body fitting-coupled to the power part at one end thereof and a male bus bar coupling part provided at an end of the male bus bar body to have a groove shape so that the female bus bar coupling part is coupled to or separated from the male bus bar coupling part through a sliding operation performed in a horizontal direction.

According to some embodiments of the present invention, the coupling structure may further include a coupling projection provided in the male bus bar coupling part.

According to some embodiments of the present invention, the coupling structure of the bus bar may further include a leaf spring mounting groove provided in one of an upper portion and a lower portion of an inner surface of the female bus bar coupling part.

According to some embodiments of the present invention, an end of the leaf spring mounting groove may be provided to be inclined.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A coupling structure of a bus bar equipped in a power part, the coupling structure comprising a female type bus bar and a male type bus bar respectively coupled to different elements of the power part, wherein the female type bus bar is fitting-coupled to the male type bus bar, wherein the female type bus bar comprises:

a female bus bar body fixing-coupled to the power part at one end thereof, and a female bus bar coupling part provided at the other end of the female bus bar body, wherein the male type bus bar comprises:

a male bus bar body fixing-coupled to the power part at one end thereof; and a male bus bar coupling part provided at the other end of the male bus bar body and coupled to or separated from the female bus bar coupling part, wherein the coupling structure further comprises:

a mounting groove provided in an inner perimeter of the female bus bar coupling part, and a spring mounted into the mounting groove.

2. The coupling structure of the bus bar of claim 1, wherein each of the female bus bar body and the male bus bar body is provided in plurality, and each of the female bus bar coupling part and the male bus bar coupling part is provided in plurality.

3. The coupling structure of the bus bar of claim 1, further comprising a spring mounted on an outer surface of the male bus bar coupling part.

4. The coupling structure of the bus bar of claim 1, wherein an inner surface of the female bus bar coupling part and an outer surface of the male bus bar coupling part are each provided in one of a circular shape, a tetragonal shape, and a polygonal shape.

5. The coupling structure of the bus bar of claim 1, wherein the female bus bar coupling part is connected or coupled to the power part.

6. The coupling structure of the bus bar of claim 1, further comprising a protection cover detachably mounted on each of the female bus bar coupling part and the male bus bar coupling part.

* * * * *